United States Patent Office 3,263,901
Patented August 2, 1966

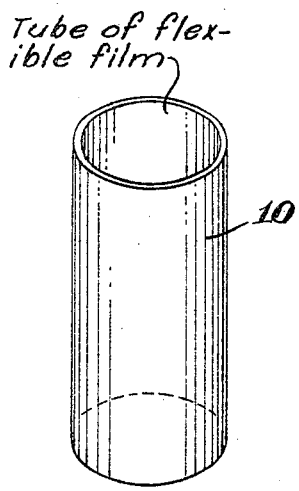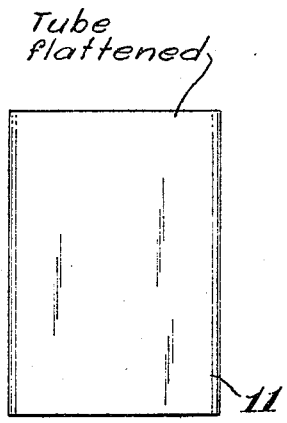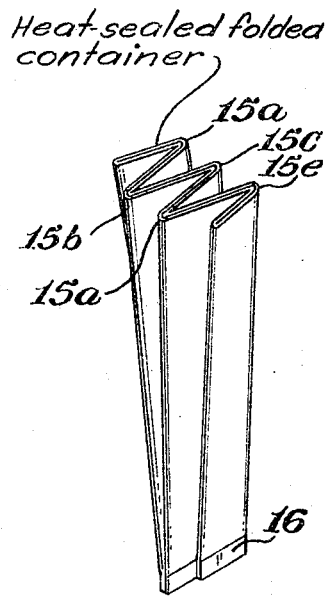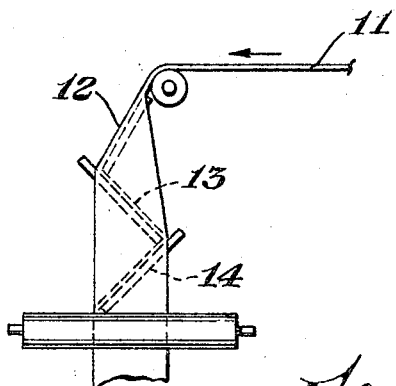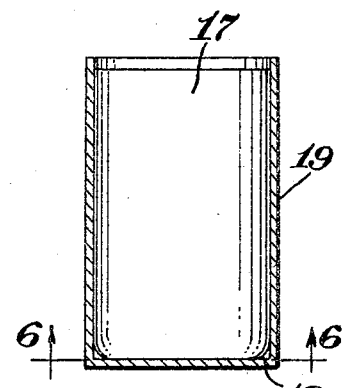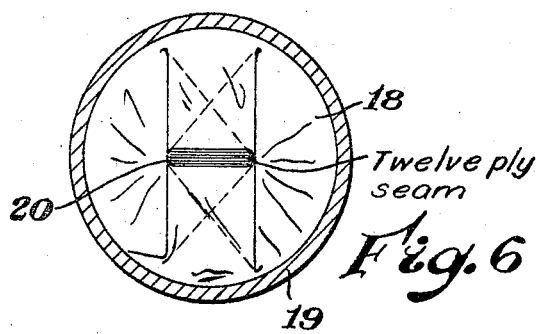

3,263,901
CONTAINER OF FLEXIBLE FILM
Russell L. Hoelzer, Fairview Park, Ohio, assignor to The Dow Chemical Company, Midland, Mich., a corporation of Delaware
Filed Dec. 23, 1964, Ser. No. 420,556
2 Claims. (Cl. 229—53)

This application is a continuation-in-part of copending application Serial No. 339,243, filed January 21, 1964, now abandoned.

The invention relates to containers formed from flexible film stock and to a method for making the same. More particularly, it relates to certain containers having a closed end of essentially circular shape and a fluid-tight seal which are further characterized by the absence of undesirably large internal air or contents entrapping pockets.

The expression "container" as used herein refers generally to tubes, bags, pouches, casings, shrouds and the like.

The expression "film" as used herein refers generally to those film- and sheet-like structures having a thickness of up to about 0.1 of an inch.

Prior known containers have been fabricated from tubular film stock by sealing one end while the other end is left open for filling. One method for the preparation of such prior known containers is to flatten one end of the tubular film stock and then seal the film plies together by application of heat and pressure. Other closure means, such as metallic staples, have been used. Containers formed in such fashion are characterized by a pillow-shaped configuration in which the seamed film plies have force applied thereto from the products introduced into such containers, which force is oftentimes sufficient to cause separation of the seam. Additionally, when such pillow-shaped container is inserted in another container having a generally cylindrical cross section, i.e., a rigid drum or the like, it does not fit snugly at the bottom and wasted space results.

It is also known that one end of a tubular film stock can be closed by gathering together the end portion and applying thereto a metallic clip or ring. Such closure, however, is uneconomical in the use of flexible film stock and is often undesirable in packaging food-stuffs. Further, unsightly folds are often present within such containers which entrap considerable amounts of the product being packaged causing such products to be difficulty removed with accompanying waste and inconvenience.

The U.S. Patent 2,819,834, issued January 14, 1958, contemplates a container having an essentially cylindrical shape and a round bottom, which is particularly adapted for use as a liner in rigid metal or fiber drums and the like. Such container is described as being formed by longitudinally folding a length of flat tubing to provide four superimposed two-layer portions each having a width corresponding to one-quarter the width of the flat tubing which, when transversely sealed together along one end, forms a bottom portion of generally cylindrical cross section. It has been found, however, that such structure does not adaquately provide for uniform distribution of stress exerted by the container contents along the closed bottom portion thereby oftentimes resulting in leakage of such contents through the sealed area. Further, such prior known structures are characterized by having undesirably large internal air or contents entrapping pockets formed by the four superimposed longitudinal folds.

Accordingly, it is an object of this invention to provide a container from flexible film stock, which, when open, has a closed end of essentially circular shape.

It is another object to form such a container wherein such closed end is fluid tight and is formed by a seam construction wherein the force exerted by materials placed in such container is essentially uniformly distributed along the seal.

It is yet another object to form such a container characterized by the absence therein of undesirably large internal pockets for the trapping of air or container contents.

Other and related objects will become apparent from the following specification and claims.

In accordance with the present invention, tubular containers of flexible film material having the above-stated combination of desirable characteristics are prepared by:

(1) folding one end portion of a flexible film along the longitudinal axis of such film to form at least five alternating essentially parallel folds which divide the film material into individual superimposed panels, wherein the interior panels of said container are of essentially equal width, and wherein the two outermost panels of the container have a width of at least about 10 percent less than the width of the interior panels, and (2) transversely sealing together all of the panels of flexible film adjacent such end portion. In the drawing:

FIGURE 1 is a perspective view of a length of seamless tube of flexible film that can be used for forming a container in accordance with the present invention.

FIGURE 2 shows the flexible tubular film in flattened form.

FIGURE 3 is a cross-sectional view of one apparatus used for forming five longitudinally disposed alternating folds in the flattened film.

FIGURE 4 is an isometric view of a folded container as obtained using apparatus as shown in FIGURE 3, and having one end transversely seamed together. The container is spread apart at its open end to better illustrate the alternating folded configuration.

FIGURE 5 shows a filled container positioned in a rigid container such as a cylindrical drum which is shown in section.

FIGURE 6 is a horizontal sectional view taken generally along the line 6—6 of FIGURES 5.

Referring now to FIGURE 1, it will be observed that the reference character 10 designates a seamless, single ply tube of flexible film material. As purely exemplary of those materials suitable for use in the present invention may be mentioned; polyvinyl chloride, copolymers of vinyl chloride and vinylidene chloride, polyvinyl acetate, polyvinyl alcohol, cellulose acetate, cellulose butyrate, cellulose nitrate, regenerated cellulose, nylon, polyethylene terephthalate, polyethylene and polypropylene, among many others known in the art. It is pointed out that any flexible tube stock may be used including multiply laminate materials aand flat film materials which have been seamed together to form tubular film stock.

The first step in fabricating a container in accordance with this invention, is to flatten the flexible tubular material 10 shown by FIGURE 1 to form a flat film or web 11 as shown by FIGURE 2. This step may be conveniently accomplished by passing such tubular film stock through the nip of a pair of rotating pressure rolls or the like apparatus.

The next step comprises folding one end of the flattened film material along the longitudinal axis of the film to form at least five alternating folds of flexible film material wherein such folds divide the film material into individual superimposed panels and wherein the interior panels of the container are of essentially equal width. This step may be accomplished using apparatus as shown in schematic cross section by FIGURE 3 wherein the flat film of web 11 is first passed over trapezoidally shaped folding boards 12 and 13 then over a triangularly-shaped folding board 14 to form a structure having five longitudinally disposed alternating folds, indicated as 15a, 15b, 15c, 15d, and 15e of FIGURE 4. It is pointed out that each panel of the container is of essentially uniform dimension (with the exception of the outermost panels as hereinafter described) each of such panels being comprised of two plies of film material. Thus the folded structure, as shown in FIGURE 4, is comprised of twelve plies of flexible film material.

It has been found that a more effective sealing of the superimposed panels of flexible film material is obtained wherein the outermost panels of the container are formed so as to have a width which is at least 10 percent less than the width of the remaining interior panels of the container. Such constructions, wherein heat-sealable film is used, can thus be more easily transversely seamed together into a fluid-tight seal at the end that is to be closed, by the application of heat from various sources including radio frequency energy.

Constructions of this type also serve to equalize stress along the sealed area of the container thereby further minimizing the possibility of possible leakage of the container contents through such sealed area.

Other various adhesive or closing means can be used where it is unnecessary to provide a fluid-type seal. The seamed construction is indicated for illustrative purposes as a heat-sealed zone 16 spaced slightly upward from the lower end of the folded structure shown isometrically by FIGURE 4.

It is pointed out that additional essentially parallel alternating folds may be formed in the containers of the present invention by utilization of additional folding apparatus positioned in the path of the flattened film or web before such films are sealed and/or cut into desired length. For example, the addition of a third triangularly-shaped folding board to the apparatus, as shown in FIGURE 3, wherein such folding board is positioned in the path of the film between the illustrated second trapezoidally-shaped folding board of the seal and/or cutting means, and in staggered relationship with such second trapezoidally shaped folding board, would produce a film structure having seven alternate folds therein. Additional folds may be added in this manner if desired; however, it may become increasingly difficult to obtain a fluid-tight seal in the end of the container which is to be closed as the number of plies of film to be sealed increases.

When the container, indicated at 17 in FIGURE 5, is expanded to receive a filling material, it is generally cylindrical in cross section and, instead of having a pillow-shaped bottom, it has a generally flat bottom as indicated at 18. As a result, when the container 17 is positioned in a rigid container 19, such as a cylindrical drum, such flexible container 17 is substantially filled at the lower end and there is a minimum of voids at the bottom of the rigid container 19. It is to be emphasized, however, that the containers of the present invention are fully capable of, and in fact are highly desirable for, the packaging of individual irregularly shaped articles of commerce including foodstuffs such as ground meat or processed cheese as well as various liquids and semi-liquids such as liquid detergents and the like.

FIGURE 6, shows at 20 the twelve-ply seam end portion which extends generally transversely of the flat bottom 18 along with multiple fold lines or creases extending radially from the seam along the periphery of the closed end. It is pointed out that because of the multiplicity of folds and creases, that force exerted by the contents of the container is not applied directly to the seam or to any one distinct rib or film barrier, but is, in fact, essentially uniformly distributed along the bottom of the container. It is also pointed out that, as a result of the formation of such multiple folds or creases, the containers of the present invention have a more rounded bottom than has heretofore been available and, in addition, have a minimum of excessively large pockets for trapping filling material therein. By way of comparison, it has been found that container structures containing less than five alternating folds or any other type of folds, wherein less than five of such folds are present; are characterized by having internal pockets of excessive size which are highly undesirable, particularly in the packaging of foodstuffs and the like.

What is claimed is:
1. A flattened tubular container of flexible film material having one end folded along the longitudinal axis of said flattened container to form at least five alternating essentially parallel folds said folds dividing said film material into individual superimposed panels, wherein the interior panels of said container are of essentially equal width and the two outermost panels of said container have a width which is at least about 10 percent less than the width of said interior panels, all of said panels being transversely sealed together along one end of said container.

2. The tubular container of claim 1, wherein said flexible film material is heat sealable.

References Cited by the Examiner
UNITED STATES PATENTS

| | | | |
|---|---|---|---|
| 1,588,695 | 6/1926 | Boehm | 150—1 |
| 2,283,069 | 5/1942 | Kneutter | 229—53 |
| 2,364,943 | 12/1944 | Brandt | 229—57 |
| 2,819,834 | 1/1958 | Brady | 229—53 |

GEORGE O. RALSTON, *Primary Examiner.*

JOSEPH R. LECLAIR, *Examiner.*

J. F. McNULTY, *Assistant Examiner.*